Jan. 2, 1962  H. C. BOHNET  3,015,162
TRAILER COUPLING GUIDE
Filed July 8, 1958  2 Sheets-Sheet 1

Herman C. Bohnet
INVENTOR.

BY *Clarence A. O'Brien*
*and Harvey B. Jackson*
Attorneys

Jan. 2, 1962  H. C. BOHNET  3,015,162
TRAILER COUPLING GUIDE
Filed July 8, 1958  2 Sheets-Sheet 2
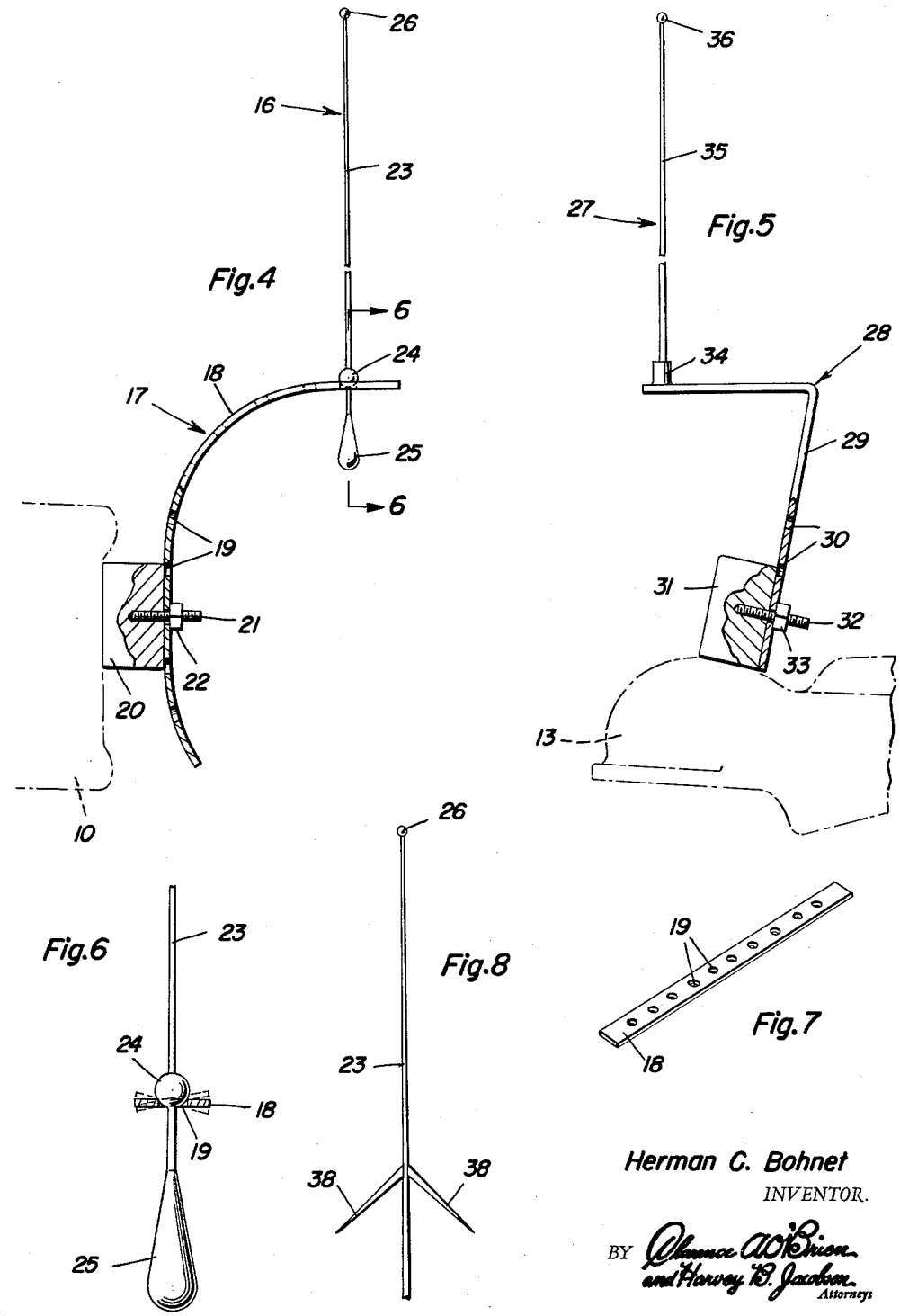
Herman C. Bohnet
INVENTOR.
BY *Clarence A.O'Brien*
*and Harvey B. Jacobson*
Attorneys

United States Patent Office 3,015,162
Patented Jan. 2, 1962

3,015,162
TRAILER COUPLING GUIDE
Herman C. Bohnet, 931 Verlinden Ave., Lansing, Mich.
Filed July 8, 1958, Ser. No. 747,146
3 Claims. (Cl. 33—46)

The present invention relates to new and useful improvements in car-trailer coupling guides and has for its primary object to provide, in a manner as hereinafter set forth, novel means whereby the operator of a towing vehicle, particularly an automobile, may, without assistance, expeditiously position the usual ball of a conventional hitch to receive the socket thereof.

Another very important object of the invention is to provide a coupling guide of the aforementioned character which is automatically adjustable by gravity to compensate for any angle or inclination of the towing vehicle relative to the trailer.

Still another important object of the present invention is to provide an adjustable guide of the character described which may be readily mounted in any suitable place on the towing vehicle and trailer without the use of clips, screws, bolts or other extraneous securing elements.

Other objects of the invention are to provide a trailer coupling guide of the character set forth which will be comparatively simple in construction, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a side elevational view, partially in section, of the front unit;

FIGURE 5 is a side elevational view, partially in section, of the rear unit;

FIGURE 6 is an enlarged view in transverse section, taken substantially on the line 6—6 of FIGURE 4;

FIGURE 7 is a detail view in perspective of one of the bendable or ductile bracket bars; and FIGURE 8 is an elevational view, showing a slight modification.

Figure 1:
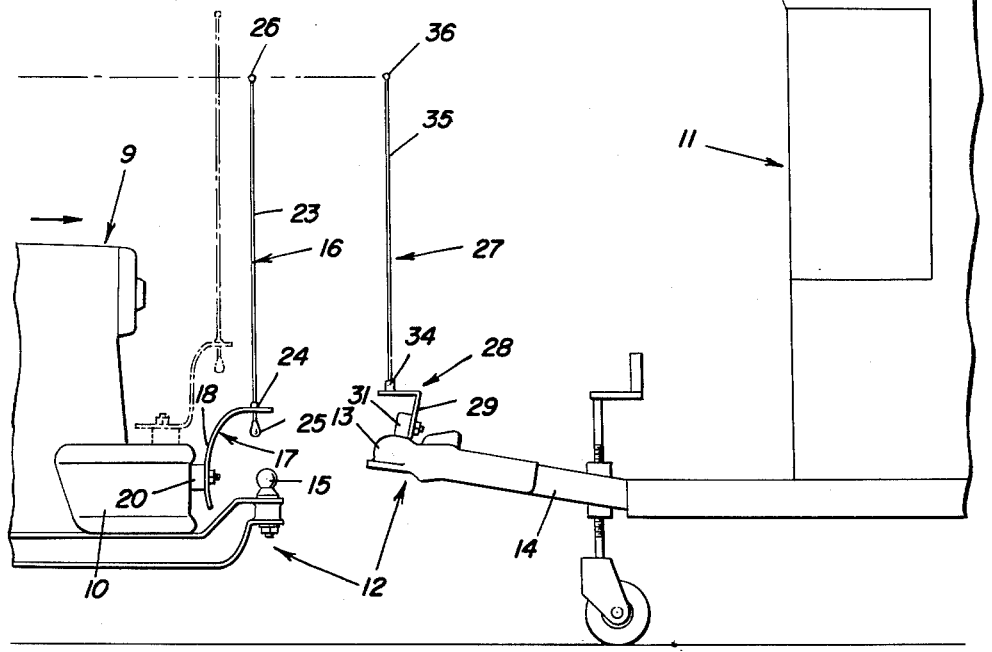
FIGURE 1 is a view in side elevation, showing a guide means embodying the present invention in position on a towing vehicle and trailer to be coupled.
Figure 2:
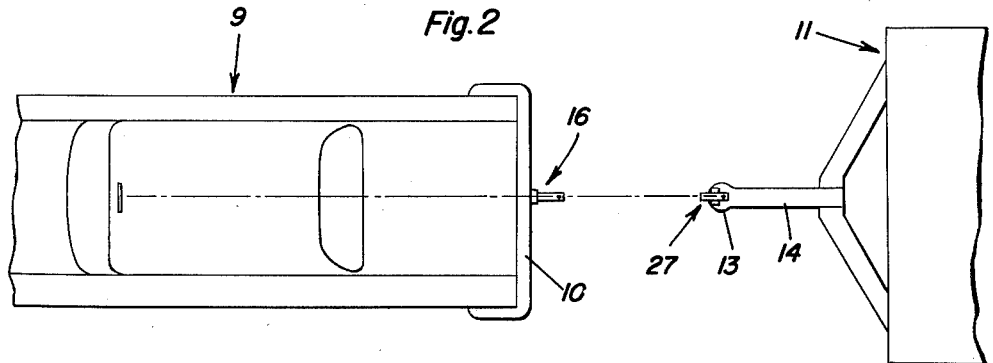
FIGURE 2 is a top plan view thereof.

Referring now to the drawing in detail, it will be seen that reference character 9 designates generally the rear end portion of a towing vehicle in the form of an automobile. The automobile 9 is equipped with the usual rear bumper 10. Reference character 11 designates generally the front end portion of a conventional house trailer. The vehicles 9 and 11 are to be coupled through the medium of a conventional hitch 12. The hitch 12 includes the usual socket 13 on the tongue 14 of the trailer 11, which socket is adapted to receive an upstanding ball 15 on the automobile 9.

Mounted on the rear end of the automobile 9 is the front unit 16 of the present invention. The unit 16 comprises a bracket 17, said bracket including an arcuate, bendable or ductile bar 18 of suitable metal having spaced openings 19 therein. Adjustably mounted on one end portion of the bar 17 is a permanent magnet 20. The magnet 20 is engageable with the automobile 9 for adjustably securing the unit 16 thereon in any suitable location. In the installation shown in full lines in FIGURE 1 of the drawing, the magnet 20 is engaged with the rear bumper 10 of the automobile. Another location is illustrated in dotted lines. Threadedly mounted in the magnet 20 is a stud 21 which is engageable selectively in the openings 19. A nut 22 is threaded on the stud 21 for securing the magnet 20 in adjusted position on the bar 17.

The front unit 16 further includes an upstanding sight rod 23 which is mounted for universal swinging adjustment on the other end portion of the bar 17. Toward this end, the sight rod 23 has its lower end portion inserted loosely through one of the openings 19 and has fixed thereon a ball 24 which rests on said bar in said one opening. A counterweight 25 is mounted on the lower end portion of the sight rod 23. Mounted on the upper end of the sight rod 23 is an indicator in the form of a ball 26.

Cooperable with the front unit 16 is a rear unit 27 which is carried by the trailer 11. The unit 27 comprises a mounting bracket 28 which includes an angular bendable or ductile bar 29 of suitable metal. One end portion of the bar 29 is provided with longitudinally spaced openings 30. Adjustably and removably mounted on the apertured end portion of the bar 29 is a permanent magnet 31, which is engageable with the socket 13 of the hitch 12 for mounting the unit 27 thereon. The magnet 31 has threadedly mounted therein a stud 32 which is engageable selectively in the openings 30. A nut 33 is threaded on the stud 32 for securing the magnet 31 in adjusted position on the bar 29.

Rising from the other end portion of the bar 29 is a socket 34 for the reception of a rear sight rod 35. The rear sight rod 35 is stationary and is provided on its upper end with an indicator in the form of a ball 36.

Figure 3:
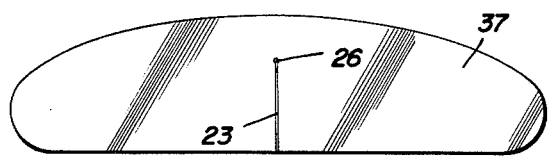
FIGURE 3 is an elevational view, looking rearwardly through the usual rear window of the towing vehicle.

It is thought that the use of the invention will be readily apparent from a consideration of the foregoing. Briefly, the rear unit 27 is mounted on the hitch socket 13 of the trailer 11 and the front unit 16 is mounted on the rear bumper 10, for example, of the automobile 9. As shown to advantage in FIGURE 1 of the drawing, when the front unit 16 is properly positioned and adjusted on the automobile 9, the sight rods 23 is forwardly offset from the ball 15. The guide rod 35 is in substantially vertical alignment with the hitch socket 13. The operator backs and maneuvers the automobile 9 as may be necessary to align the ball indicators 26 and 36 on the sight rod 23 and 35, respectively, as viewed from the driver's seat through the rear window 37 (see FIGURE 3) of the vehicle. With the indicators 26 and 36 thus aligned the automobile 9 is backed to bring said indicators closely adjacent to each other thereby vertically aligning the ball 15 with the socket 13 in an obvious manner for receiving said socket. The counterweight 25 automatically maintains the sight rod 23 in a vertical position at all times regardless of the angle or inclination of the automobile 9. The bendable bars 18 and 29, together with the removable and adjustable magnets 20 and 31, permit various conditions that may be encountered to be readily met. In FIGURE 8 of the drawing reference character 38 designates angle sights which may be provided on the front sight rod 23 when the automobile is on uneven ground or in an angular position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A guide to facilitate coupling a towing vehicle to a trailer, said guide comprising a bracket including a flat, readily bendable ductile bar having longitudinally spaced openings therein, an upstanding sight rod on one end portion of the bar, and means for removably mounting the bracket on a vehicle, said means including a permanent magnet selectively mountable on either side of the bar, a stud on said magnet selectively insertable through the openings, and a retaining nut threaded on the stud for securing the magnet in a longitudinally adjusted position on the bar.

2. A guide to facilitate coupling a towing vehicle to a trailer, said guide including a bracket comprising a flat, readily bendable ductile bar having a series of longitudinally spaced openings therein, one of the end openings having a concave wall providing a socket, an upstanding sight rod mounted in said one of said end openings, a sphere fixed on the sight rod adjacent to but spaced from the lower end thereof and seated in the socket for mounting said sight rod on the bar for universal swinging and rotary adjustment, a weight on the lower end of the sight rod for maintaining same in a vertical position on the bracket by gravity, a ball on the upper end of the sight rod, and means for removably and adjustably mounting the bracket on a vehicle.

3. A guide to facilitate coupling a towing vehicle to a trailer, said guide including a bracket comprising a flat, readily bendable ductile bar having a series of longitudinally spaced openings therein, one of the end openings having a concave wall providing a socket, an upstanding sight rod mounted in said one of said end openings, a sphere fixed on the sight rod adjacent to but spaced from the lower end thereof and seated in the socket for mounting said sight rod on the bar for universal swinging and rotary adjustment, a weight on the lower end of the sight rod for maintaining same in a vertical position on the bracket by gravity, a ball on the upper end of the sight rod, and means for removably and adjustably mounting the bracket on a vehicle, said means comprising a permanent magnet selectively engageable with either side of the bar and longitudinally adjustable thereon, a stud on said magnet selectively insertable in the other openings, and a retaining nut threaded on said stud for securing the magnet in adjusted position.

References Cited in the file of this patent

UNITED STATES PATENTS

| | | |
|---|---|---|
| 706,175 | Hanneborg | Aug. 5, 1902 |
| 1,135,914 | Olesberg | Apr. 13, 1915 |
| 1,572,851 | Spreen | Feb. 9, 1926 |
| 1,914,617 | Rogers | June 20, 1933 |
| 2,417,234 | Calow | Mar. 11, 1947 |
| 2,555,954 | Bruflat | June 5, 1951 |
| 2,735,639 | Gilfrey | Feb. 21, 1956 |
| 2,760,744 | Watrous | Aug. 28, 1956 |
| 2,794,263 | Crammer | June 4, 1957 |
| 2,815,732 | Majors | Dec. 10, 1957 |